Patented Jan. 14, 1941

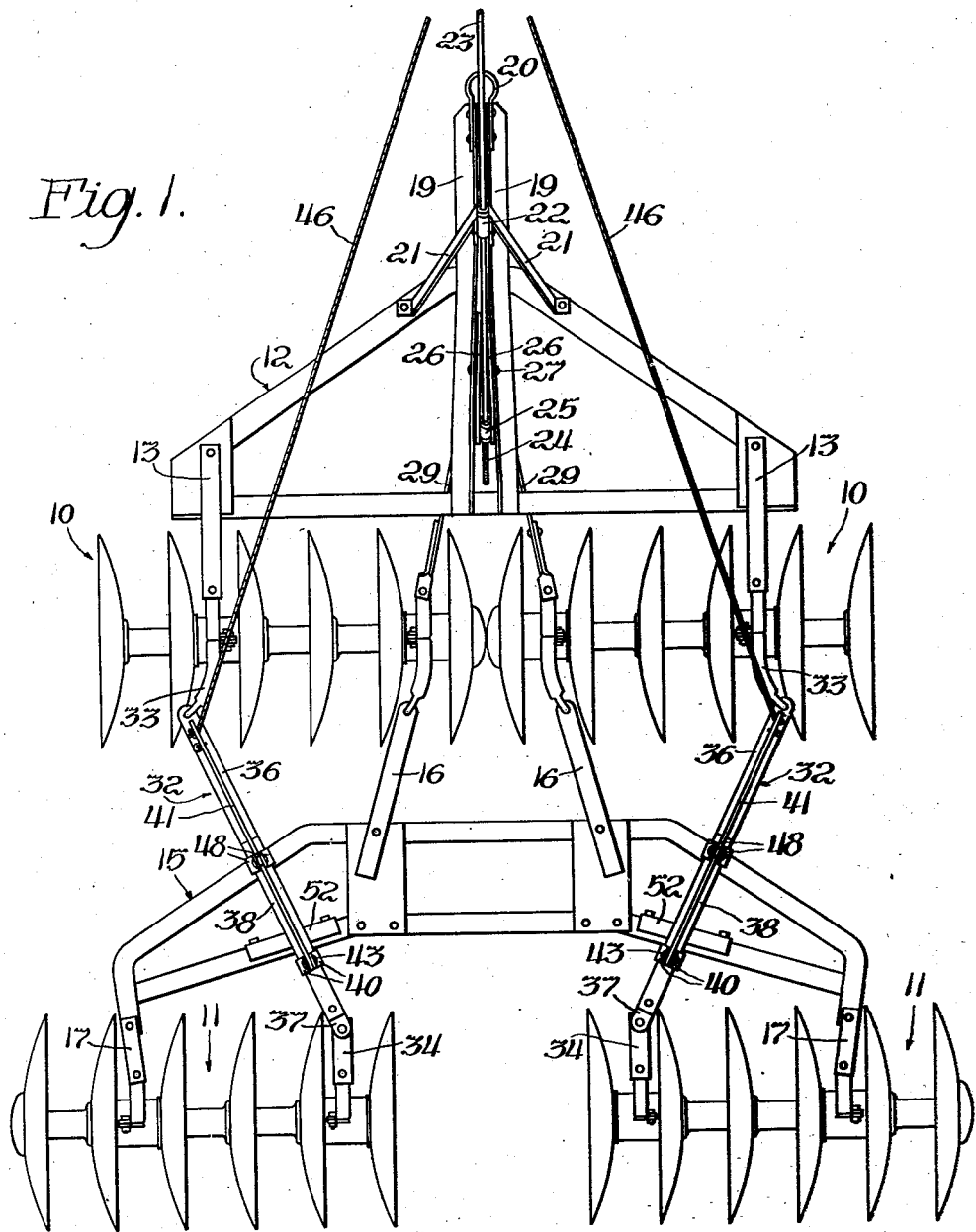

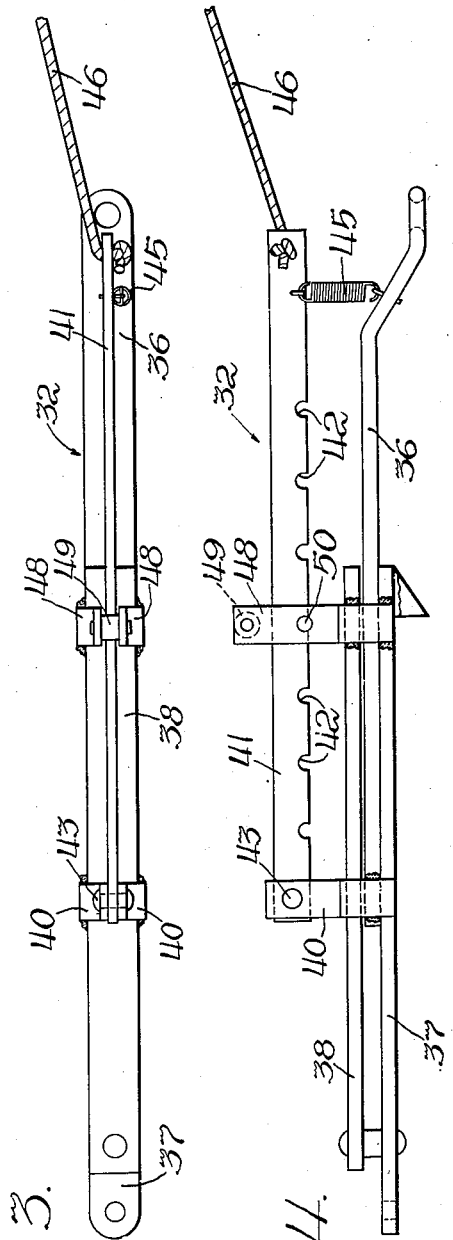
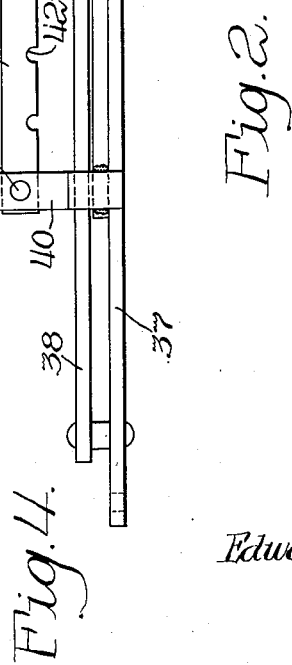
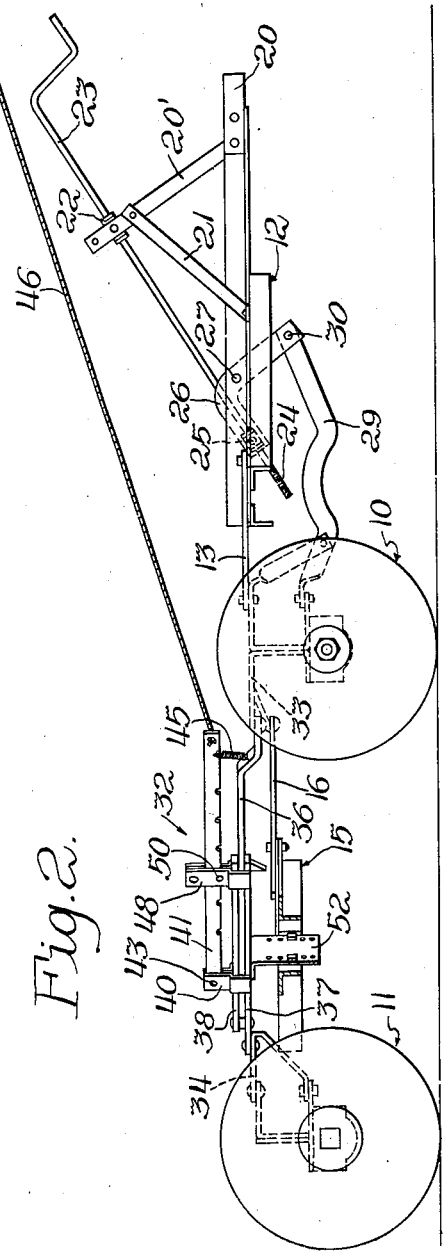

2,228,508

UNITED STATES PATENT OFFICE 2,228,508

HARROW CONSTRUCTION

Charles F. Crumb, Chicago, and Edward Mowry and Raymond H. Book, Rock Falls, Ill., assignors to International Harvester Company, a corporation of New Jersey Application October 15, 1938, Serial No. 235,234

9 Claims. (Cl. 55—83)

This invention relates to a harrow construction. More specifically, it relates to a tandem disk harrow provided with front and rear gangs in which there is both separate and joint adjustment of the front and rear gangs.

Harrow constructions of the type in which there is joint adjustment of both front and rear gangs are well known. There are some constructions which permit both joint adjustment of all of the gangs and separate adjustment of either the front gangs or the rear gangs. It is to a harrow of this type that the present invention relates.

An object of the present invention is an improved harrow construction.

A further object is to provide a harrow having front and rear gangs in which there is both joint adjustment of front and rear gangs and separate adjustment of the rear gangs.

Another object is to provide a harrow construction adapted to be drawn by a tractor which has controls within reach of an operator's seat on the tractor for effecting joint adjustment of both front and rear gangs and separate adjustment of the rear gangs.

According to the present invention, a harrow is provided which has a pair of front gangs, a pair of rear gangs, a front frame connected to the outer ends of the front gangs, a rear frame connected to the outer ends of the rear gangs and to the inner ends of the front gangs, an adjusting device mounted on the front frame for joint adjustment of both front and rear gangs, and adjustable links connecting the outer ends of the front gangs and the inner ends of the rear gangs by means of which a separate adjustment of the rear gangs is effected.

In the drawings—

Figure 1 shows a plan view of the novel harrow;

Figure 2 shows a side view of the same;

Figure 3 shows a detailed plan view of the novel adjustable connection between the outer ends of the front gangs and the inner ends of the rear gangs; and Figure 4 shows a detailed side view of this same connection.

The harrow of the present invention includes a pair of front gangs 10 and a pair of rear gangs 11. A front frame 12 is connected adjacent the outer ends of the front gangs by means of links 13. A rear frame 15 is connected with the inner ends of the front gangs by means of links 16, and adjacent the outer ends of the rear gangs by means of links 17. The front frame 12 has a pair of longitudinally extending angle irons 19 which form a support for a draft head 20 adapted to be connected to a tractor, not shown. Also mounted on the angle irons 19 is a pair of members 20' and 21, which support a collar 22. This collar 22, in turn, supports a crank rod 23, which has a threaded end 24 in engagement with a nut 25. This nut is secured between a pair of bell crank members 26 adjacent one end thereof. The bell crank members are pivoted on the front frame 12 at 27. Links 29 are pivotally connected at the other end of the bell crank members 26 at 30 and are also connected to the inner ends of the front gangs.

Adjustable links 32 are connected adjacent the outer ends of the front gangs 10 by means of extension pieces 33 and to the inner ends of the rear gangs by means of members 34. As will be seen from Figures 3 and 4, each of the adjustable links 32 comprises a piece 36 bent adjacent one end and connected to the extensions 33 on the front gangs, and a pair of pieces 37 and 38 secured in spaced parallel relation to one another, the piece 37 being connected to the part 34 secured to the inner ends of the rear gangs 11. The piece 36 extends between the pieces 37 and 38 in sliding telescopic relation. Members 40 are welded to opposite sides of the piece 36 and extend upwardly from it. A bar 41, having notches 42, is pivoted at one end at 43 between the members 40. A spring 45 is connected adjacent the other end of the bar 41 and to the piece 36, so as to pull the bar 41 toward the piece 36. A cord or chain 46 is also connected at this end of the bar 41 and extends to within reach of an operator's seat on the tractor, not shown. Side members 48 are secured to the sides of the pieces 37 and 38 and extend upwardly from them in spaced relation. Pins 49 and 50 extend between these side members and the bar 41 is adapted to fit between the side members and between the pins with any one of the notches 42 engaging the pin 50. The action of the spring 45 is such as normally to pull the bar 41 toward the piece 36 and keep the pin 50 in engagement with the notch 42. This means that in this condition there can be no relative longitudinal movement between the piece 36 and the pieces 37 and 38. Consequently, the link 32 remains fixed in length. An upward pull upon the end of the bar 41, by means of the cord 46, disengages the notch 42 from pin 50, and relative movement between the piece 36 and pieces 37 and 38 is then allowed so that the link 32 may now vary in length.

Angle members 52 are secured to the rear frame 15 and extend upwardly therefrom, presenting wide portions upon which the pieces 37 may rest. These members 52 provide the proper support so that the pieces 36, 37 and 38 are kept in proper alinement and may slide easily with respect to one another without a jamming because of the weight of these pieces, the bar 41, and side members 40 and 48.

Figure 1 shows both front and rear gangs in parallel transport position. When the gangs are to be put into angled working position, the crank 23, which is within reach of the operator's seat on the tractor, is turned. The nut 25 moves longitudinally of the crank and swings the bellcrank members 26 in such a direction as to move the inner ends of the front gangs 10 rearwardly by means of the links 29. The outer ends of the rear gangs are also moved rearwardly because of their connection with the inner ends of the front gangs through the rear frame 15, the links 16, and the links 17. If a separate adjustment of the rear gangs is desired, the operator of the tractor pulls upon the cord 46, so as to release a notch 42 from the pin 50. Then, if it is desired to bring the rear gangs more nearly into their original transport position, the harrow is pulled forwardly. This means that the piece 36 tends to move out from a position between the pieces 37 and 38 so that the links 32 are lengthened. During this procedure, the inner ends of the rear gangs will remain approximately in their original position and the outer ends of the rear gangs will be moved forwardly along with the forward movement of the rest of the tractor, so that the rear gangs now occupy a position more nearly like that of the transport position. With the angle of the rear gangs properly set, the cords 46 are released by the operator of the tractor and the pin 50 of each link 32 is caused to engage a new notch 42 so as to fix the length of the link 32 again. If it is desired to increase the angle of the rear gangs, the tractor operator pulls upon the cords 46 and backs the harrow so as to reduce the length of the links 32 by movement of the piece 36 further into telescoping relation with the pieces 37 and 38.

If a separate adjustment of just one of the rear gangs 11 is desired, then the tractor operator pulls only on one of the cords 46 and the harrow is backed or pulled forward for an increasing or decreasing of the angle of the particular rear gang as may be desired.

It will be apparent from the above description that a novel harrow construction has been provided, by which there is joint adjustment of both front and rear gangs and separate adjustment of the rear gangs. These adjustments are easily effected by devices extending within reach of an operator's seat on a tractor adapted to pull the harrow.

The intention is to limit the invention only within the terms of the appended claims.

What is claimed is:

1. In a disk harrow, a pair of front gangs, a pair of rear gangs, means for placing the gangs in angle, and means for varying the angle of either or both of one of the pairs of gangs independently of change in position of the other pair of gangs, said means comprising adjustable connections between the gangs, each composed of a pair of parallel spaced members connected to one gang, a third member connected to another gang and extending between the pair of members, pieces secured to the sides of the pair of members, a pair of pins extending between the pieces, another pair of pieces secured to the third member, a notched bar pivoted between the second pair of pieces and extending between the pieces secured to the pair of members and between the pins with the notches adapted to engage one of the pins, and resilient means urging the bar toward the third means to keep a notch thereof in engagement with the one pin.

2. In a harrow, the structure as specified in claim 1, and flexible members extending from the notched bars within reach from an operator's seat on a tractor adapted to pull the harrow.

3. A harrow construction comprising a pair of front gangs, a pair of rear gangs, a frame positioned between the pairs of gangs and connected to the inner ends of the front gangs and to the outer ends of the rear gangs, adjustable links connecting the inner ends of the rear gangs and the outer ends of the front gangs, and supporting pieces for the adjustable links extending upwardly from the frame.

4. A harrow construction comprising a pair of front gangs, a pair of rear gangs, a frame positioned between the front and rear gangs, adjustable connections between the front and rear gangs for effecting independent angular adjustment thereof, and supporting means for the adjustable connections on the frame.

5. In a disk harrow, a front draft frame, a front pair of gangs, means for pivotally connecting the outer ends of the gangs to the frame, an adjusting means on the front frame, means for pivotally connecting the inner ends of the front gangs to the adjusting means for angling the gangs, a rear frame, means for pivotally connecting the rear frame to the inner ends of the front gangs, a rear pair of gangs, means for pivotally connecting the outer ends of the rear gangs to the rear frame, and means pivotally connecting the outer ends of the front gangs and the inner ends of the rear gangs for holding one rear gang in angle and the other rear gang out of angle.

6. In a disk harrow, a front draft frame, a front pair of gangs, means for pivotally connecting the outer ends of the gangs to the frame, an adjusting means on the front frame, means for pivotally connecting the inner ends of the front gangs to the adjusting means for angling the gangs, a rear frame, means for pivotally connecting the rear frame to the inner ends of the front gangs, a rear pair of gangs, means for pivotally connecting the outer ends of the rear gangs to the rear frame, members pivoted on the inner ends of the rear gangs, members pivoted on the outer ends of the front gangs, and latch means mounted on said members and controllable from an operator's seat on a tractor adapted to pull the harrow.

7. In a disk harrow, a front draft frame, a front pair of gangs, means for pivotally connecting the outer ends of the gangs to the frame, an adjusting means on the front frame, means for pivotally connecting the inner ends of the front gangs to the adjusting means for angling the gangs, a rear frame, means for pivotally connecting the rear frame to the inner ends of the front gang, a rear pair of gangs, means for pivotally connecting the outer ends of the rear gangs to the rear frame, and latch means pivotally connected to the outer ends of the front gangs and the inner ends of the rear gangs, said latch means comprising a pair of bars pivoted on the inner ends of the rear gangs, a bar pivoted on the outer ends of the front gangs and disposed between said pair of bars, a latch having a series of recesses pivoted on the bar, a member secured on the pair of bars having a portion adapted to engage the recesses of the latch, and a rope connected to said latch and controllable from an operator's seat on a tractor adapted to pull the harrow.

8. In a disk harrow, a front draft frame, a front pair of gangs, means for pivotally connecting the outer ends of the gangs to the frame, an adjusting means on the front frame, means for pivotally connecting the inner ends of the front gangs to the adjusting means for angling the gangs, a rear frame, means for pivotally connecting the rear frame to the inner ends of the front gangs, a rear pair of gangs, means for pivotally connecting the outer ends of the rear gangs to the rear frame, members pivoted on the inner ends of the rear ganges and extending forwardly toward the front gangs, members pivoted on the outer ends of the front gangs and extending rearwardly toward the rear gangs, and latch means connected between said members for adjustably securing the forwardly extending members to the rearwardly extending members.

9. In a disk harrow, a front draft frame, a front pair of gangs, means for pivotally connecting the outer ends of the gangs to the frame, an adjusting means on the front frame, means for pivotally connecting the inner ends of the front gangs to the adjusting means for angling the gangs, a rear pair of gangs, means for pivotally connecting the inner ends of the front gangs to the outer ends of the rear gangs, members pivoted on the inner ends of the rear gangs and extending forwardly toward the front gangs, members pivoted on the outer ends of the front gangs and extending rearwardly toward the rear gangs, and latch means connected with said members for adjustably securing the forwardly extending members to the rearwardly extending members.

CHARLES F. CRUMB.
EDWARD MOWRY.
RAYMOND H. BOOK.